Figure 1:
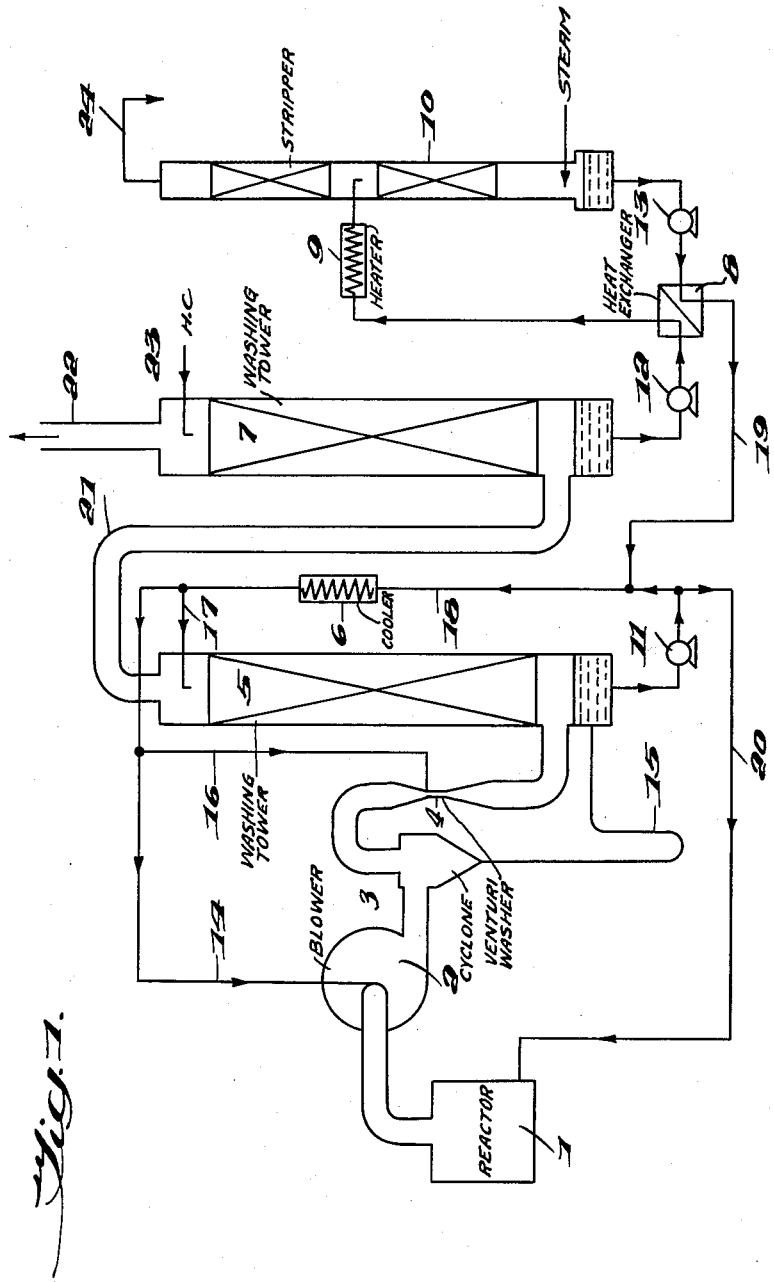

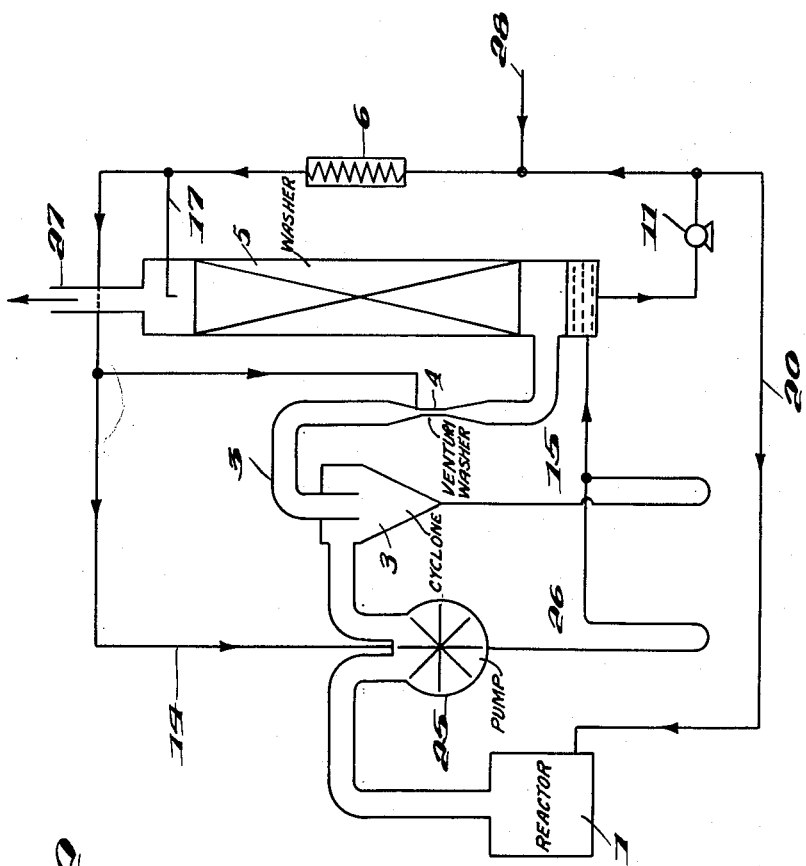

United States Patent Office 3,008,807
Patented Nov. 14, 1961

3,008,807
APPARATUS FOR PURIFYING GASES
Richard Hilgert, Walter Jahnentz, and Herbert Schmidt, all of Marl, Kreis Recklinghausen, Germany, assignors to Chemische Werke Huls Aktiengesellschaft, Kreis Recklinghausen, Germany, a corporation of Germany
Filed Oct. 30, 1957, Ser. No. 693,409
Claims priority, application Germany Nov. 15, 1956
4 Claims. (Cl. 23—260)

It is known that acetylene can be produced by cracking hydrocarbons in the gaseous phase as well as in the liquid phase. In the procedures for the production of acetylene by cracking hydrocarbons in the liquid or gaseous phase, there are formed, besides acetylene also unsaturated, easily polymerizable compounds, particularly higher acetylenes as well as substantial quantities of soot. This soot remains for the most part in the liquid hydrocarbons in which the cracking takes place but to a smaller extent it is carried along by the cracked gas. Considerable quantities of hydrocarbon vapors as well as hydrocarbon droplets in the form of mist are likewise carried along by the cracked gas. The elimination of these contaminations from the cracked gas involves great difficulties because they form a hard-to-treat mixture of oily hydrocarbons, polymerizable compounds and soot. Particularly unpleasant phenomena appear when the cracked gas is cooled. Then the soot particles (diameter below 1 m$\mu$) contained in the cracked gas act as condensation nuclei forming a mist which is difficult to separate. If the separation of the soot or mist is carried out by the customary procedures, for example with the aid of cyclones, electro- or bag filters, then the contaminations are obtained in the form of a sticky hydrocarbon soot paste, which in a short time obstructs the apparatus and clogs the filters. Unsaturated polymerizable compounds, especially higher acetylenes, separated at the same time as well as dissolved in the paste, encrust the deposits, as a result of the formation of polymerization products, and thereby form hard coatings on the walls of the separators which are difficult to remove. An oil washing, followed by soot removal does not solve the problem, since the fine mist is not absorbed by an oil washing of the usual type, for example in packed, bell tray or sieve tray columns.

It has been found that the cracked gases formed by cracking hydrocarbons in the liquid phase can be freed of soot and hydrocarbon mist very advantageously, avoiding the mentioned difficulties, if the liquid hydrocarbons to be cracked are first used, before their entrance into the reactor, in a washing apparatus provided with one or more scrubbers as washing liquid for the cracked gases leaving the reactor. In this way the cleaning of the customary washing oil which otherwise is used and which needs to be done from time to time is avoided. Suitable scrubbers are those in which the washing liquid is distributed by means of a high gas and/or liquid velocity. Due to the high relative velocity between the washing liquid distributed in the scrubber and the cracked gas, as well as to the strong turbulence of the gas in the scrubber, the components to be eliminated are brought into intimate contacts with the droplets of the washing liquid and absorbed or wetted by them and as a result they easily agglomerate and can then be eliminated practically completely with known devices. If there is a sufficient pressure drop for the cracked gas then a Venturi washer can be used for example as the scrubber. If a suction blower is used to overcome the line and apparatus resistances, then a scrubber should be used which simultaneously serves for gas transportation. At low operating temperatures and high viscosity of the hydrocarbon to be cracked rotating centrifugal absorbers according to Piazza and Ricardo are preferred, since this type of scrubber also permits working with very viscous washing liquids.

The scrubber is expediently followed by a cyclone and/or a packed washing tower irrigated with the hydrocarbon to be cracked. Both apparatus serve to separate the hydrocarbon used for the washing out of the cracked gas. If sufficient cleanliness of the cracked gas cannot be attained with one scrubber, then several scrubbers and under certain circumstances different types of scrubbers, can be connected in series, with separators inserted if necessary. It may be advantageous to operate the individual scrubber stages at different temperatures. If for example one washing stage is a Venturi washer and the temperature of the washing liquid introduced is considerably lower than the temperature of the entering cracked gas, then a portion of the hydrocarbon vapors contained in the cracked gas corresponding to this temperature gap condenses here. The soot particles contained in the cracked gas act as condensation nuclei and tend to agglomerate more easily because of the wetting with the hydrocarbon which has occurred. Thus it is still possible to attain high degrees of separation in the Venturi washer even at low soot concentration.

In cracking hydrocarbons in vacuum it may be advantageous to use as a scrubber or at least as the first stage thereof a vacuum pump (liquid ring-, liquid jet-pump or other expedient designs) operated with the hydrocarbon to be cracked, whereby this pump takes over the function of the scrubber and at the same time produces the vacuum needed in the cracking reactor.

In the treatment of the cracked gas in the scrubber the higher acetylenes are dissolved, while the soot forms an easily mobile suspension with the hydrocarbon to be cracked, which can be passed through packed columns without difficulty. The hydrocarbon contaminated with soot, etc. by the washing process in the scrubber is then charged into the cracking reactor. Thus the soot taken up in the washers combines with the soot remaining in the hydrocarbon during the cracking process and is separated together with the latter from the hydrocarbon, for example by centrifuging. The polymerizable compounds taken up in the scrubbers by the hydrocarbon to be cracked are likewise polymerized at the high temperature of the cracking reactor, flocculated out and removed with the soot.

Besides extensively removing of soot, hydrocarbon mist and vapors as well as disturbing unsaturated compounds from the cracked gas, the process also makes possible the direct cooling of the hot cracked gas by the finely divided washing liquid in the scrubber. The fine distribution of the washing liquid and the strong turbulence in the scrubber produce such a good heat transfer that the cracked gas is cooled down fast enough even in small apparatuses. This procedure of direct cooling of the cracked gas with washing liquid is far superior to the direct cooling with water as well as the indirect cooling.

If one wants to remove the aromatic light oils which were not caught in the preceding washing, particularly benzene, from the cracked gas, then one can arrange an additional washing stage with the same hydrocarbon as washing liquid. However, it is expedient to combine the subsequent washing with a light oil stripper, since a return of the aromatic light oil into the cracking reactor is unadvisable because of the extraordinarily high soot yield by cracking the latter. A trouble-free operation of said subsequent light oil washing, provided with a stripper, is however possible, since the cracked gas is practically free of soot upon entering this washing stage and higher acetylenes, which could contaminate the apparatuses with their polymerizates, have also been extensively removed in the previous washing stages as a result of the better solubility as well as due to the polymerization which occurs rapidly in the washing oil.

The hydrocarbon to be cracked is first supplied to the circulating washing liquid of the light oil washing step, then runs through the washing stage equipped with one or more scrubbers, is charged there with soot and disturbing unsaturated compounds, particularly higher acetylenes, and then flows to the cracking reactor. Cracked gas and the hydrocarbon to be cracked, which is first used as washing liquid thus move in counter-current. Since only a limited amount of cracked gas is formed per kg. of cracked hydrocarbon, and its content of soot and disturbing unsaturated compounds does not exceed a definite maximum value, the amount of washing liquid flowing through is always high enough in order to assure the desired washing effect in both washing stages.

Two advantageous modes of operation of the invention will be explained with reference to the accompanying drawings.

FIG. 1 is a diagrammatic representation of a cracking plant for liquid hydrocarbons, in which the cracking process is carried out under atmospheric or superatmospheric pressure, FIG. 2 is a diagrammatic representation of a cracking plant in which the cracking process is carried out at subatmospheric pressure.

In the cracking plant represented in FIG. 1 the liquid hydrocarbons are cracked thermally or electrically in reactor 1 under atmospheric pressure or under a slight superatmospheric pressure. The cracked gas formed then passes to blower 2, which conveys the cracked gas to the subsequently connected apparatuses. This blower 2, to which the hydrocarbon to be cracked is supplied as washing liquid through line 14, at the same time acts as a first scrubbing stage. In blower 2 the washing liquid is sprayed into the rapidly flowing gas stream and is finely dispersed therein, which results in a good degree of separation of the soot contained in the cracked gas. Then the cracked gas is supplied to cyclone separator 3, which separates the fine droplets of the washing liquid, charged with soot, from the gas. The washing liquid charged with soot flows through trapped pipe 15, down to the sump of washer 5. The pre-cleaned gas now passes through Venturi washer 4 to which the hydrocarbon to be cracked is supplied through line 16 as washing liquid. The washing liquid entering through spray holes in the tube wall of Venturi washer 4 is finely atomized by the gas streaming through the Venturi washer at a high speed and takes the soot out of the cracked gas almost completely. In this second scrubbing stage any degree of purity of the cracked gas required for the further processing can be achieved by providing a correspondingly high gas velocity in the throat of Venturi washer 4 and a sufficiently large quantity of the washing liquid.

The cracked gas is then conveyed from Venturi washer 4 tangentially and at high velocity to the lower part of washing tower 5, whereby the greater part of the fine droplets of the washing liquid charged with soot are separated from the cracked gas. In the passage of the cracked gas through packed washing tower 5 which is charged through line 17 with washing liquid, the residual droplets formed in scrubbers 2 and 4 are removed from the cracked gas.

Since for carrying out washing operations in apparatus 2, 4 and 5, the hydrocarbon to be cracked is used as washing liquid, and since the quantity, besides supplying blower 2 and Venturi washer 4, is not sufficient for the satisfactory irrigation of the filler bodies of washing tower 5, the washing liquid from the sump of washing tower 5, to which is also added the washing liquid from separator 3 through trapped pipe 15, is recycled through pump 11 and lines 18, 14, 16 and 17 to blower 2, Venturi washer 4 and washing tower 5.

As a result of the intimate contact of gas and washing liquid in apparatus 2, 4 and 5 connected in series, the heat of the cracked gas is transferred to the washing liquid and eliminated by cooler 6 in line 18. Thus blower 2, Venturi washer 4 and washing tower 5 also act as direct gas coolers.

The same amount of hydrocarbon as is supplied to the cycle of the washing liquid in apparatus 2, 4 and 5 through line 19, passes also through pump 11 and line 20 to the cracking process in reactor 1.

The cracked gas leaving washer tower 5, freed of soot and disturbing unsaturated compounds, is now conveyed through line 21 to washing tower 7, in which the aromatic light oils formed in the cracking process, particularly the benzene, are eliminated from the cracked gas.

The purified cracked gas is led through line 22 to the further processing stages (not shown). As washing liquid, the hydrocarbon to be cracked is supplied to the installation through line 23 into washing tower 7. The washing liquid charged with the aromatic light oils is passed from the sump of washing tower 7 through pump 12, heat exchanger 8 and heater 9 to stripper 10 which is steam operated. The aromatic light oils driven off pass through the top of column 10 and are withdrawn through line 24 for further utilization. The hot hydrocarbon used first as washing liquid and freed from aromatic light oil is conveyed from the still of stripper 10 through pump 13, heat exchanger 8 and line 19 to the superposed washing stage consisting of blower 2, Venturi washer 4 and washing tower 5, whereby a counter-current is achieved for the cracked gas and the hydrocarbon to be cracked which is first used as washing liquid. In heat exchanger 8 the hot washing liquid discharged from the still of stripper 10 transfers a part of its heat and thereby preheats the washing liquid flowing from the sump of washing tower 7 to stripper 10. The soot and other impurities washed out of the cracked gas accumulate in reactor 1 and may be removed therefrom as required.

In the cracking plant represented in FIG. 2, the liquid hydrocarbons are cracked in reactor 1 under subatmospheric pressure (about 0.25 atm. absolute pressure), in order to avoid or diminish the soot formation. To produce a subatmospheric pressure in reactor 1 the cracked gas is sucked from reactor 1 by pump 25, compressed thereby to a slight superatmospheric pressure (about 1.1 atm. absolute pressure) and conveyed to the subsequently connected apparatus. Pump 25, to which the hydrocarbon to be cracked is supplied through line 14 acts at the same time as the first scrubbing stage. A quantity of the hydrocarbon to be cracked corresponding to that supplied, runs through trapped pipe 26, back into the sump of washer 5 with the absorbed soot. The cracked gas is conveyed to cyclone separator 3, which separates the fined droplets of liquid hydrocarbon, charged with soot, from the gas. The collected washing liquid, charged with soot, flows through trapped pipe 15 likewise to the sump of washer 5.

The pre-cleaned gas then passes through Venturi washer 4, to which the hydrocarbon to be cracked is supplied as washing liquid through line 16. The washing liquid entering through the spray holes in the tube wall of Venturi washer 4 is finely atomized by the gas streaming at high velocity, and removes the soot from the cracked gas almost completely.

The cracked gas is subsequently introduced at high velocity tangentially into the lower part of washing tower 5, whereby the greater part of the fine droplets of the washing liquid, charged with soot, are separated from the cracked gas. By the passage of the cracked gas through the packing of washing tower 5, charged through line 17 with the hydrocarbon to be cracked, the residual droplets of the washing liquid, which have been formed in the scrubbers 25 and 4, are eliminated from the cracked gas. The cracked gas cleaned in this way is supplied through line 27 to the further processing stages (not shown).

Since the hydrocarbons to be cracked are used for the washing operation in apparatus 25, 4 and 5, and the quantity besides suppling pump 25 and Venturi washer 4 is not sufficient for satisfactory irrigation of the packing of washing tower 5, the hydrocarbons used as washing liquid are returned from the sump of washing tower 5 through pump 11 and line 18 in a cycle operation to pump 25 as well as to Venturi washer 4 and washing tower 5. As a result of the intimate contact of gas and washing liquid in the serially connected apparatus 25, 4 and 5, the heat of the cracked gas is transferred to the washing liquid and eliminated by cooler 6 in line 18. Thus pump 25, Venturi washer 4 and washing tower 5 in addition act as direct gas coolers. The same quantity of hydrocarbons to be cracked, as supplied to the cycle of the washing stage consisting of apparatus 25, 4 and 5 from a storage tank (not shown) through line 28, passes through pump 11 and line 20 to the cracking process in reactor 1.

The invention is illustrated by the following example.

In an apparatus for the cracking of hydrocarbons in the liquid phase according to U.S. Patent No. 2,353,770 a crude oil of a boiling range of 150–400° C. is cracked and thereby an acetylene-containing cracked gas is produced in a quantity of 100 standard cu. m. per hour. The cracked gas leaves reactor 1 at 150° C. It contains soot in an amount of 1.5 gm. per standard cu. m. and hydrocarbon vapors and entrained liquid hydrocarbons in an amount of about 170 gm. per standard cu. m.

In the first scrubber 2, which is operated as a liquid charged blower and is fed through line 14 with the liquid hydrocarbons to be cracked as washing liquid in an amount of 1 metric ton per hour, the gas is cooled down to 50° C. and the soot content is reduced to 100 mg. per standard cu. m. At the same time the greater part of the hydrocarbon vapors condenses.

In cyclone separator 3 the cracked gas is freed of the greater part of the sprayed washing liquid. This liquid is discharged through trapped pipe 15 into the sump of washing tower 5. The sump serves as receiver for pump 11 in the cycle of the washing liquid of the entire first washing stage. The cracked gas is cooled down to 30° C. in a second scrubber 4, which is a Venturi washer and to which the hydrocarbons to be cracked are supplied as washing liquid through line 16 in an amount of 100 kg. per hour. The soot content of the gas is thereby reduced down to 4 mg. per standard cu. m.

In the oil-irrigated packed washing tower 5, the cracked gas is then cooled down to 22° C. and the washing liquid sprayed in the Venturi washer is separated from the gas. The hydrocarbon to be cracked, which is supplied as washing liquid through line 17 to the top of washing tower 5 in an amount of 1 metric ton per hour, is previously cooled down to 20° C. in cooler 6.

The practically soot-free cracked gas is then supplied through line 21 to washing tower 7, in which it is freed from benzene and its homologs. The hydrocarbons to be cracked, acting as washing liquid, are conveyed to the top of the washing tower 7 through the line 23 in an amount of 190 kg. per hour.

The washing liquid charged with light oil in the tower 7 is conveyed through the pump 12, the heat exchanger 8 and the heater 9 to the stripper 10 at a temperature of 180° C. In column 10 benzene and its homologues are stripped with steam. The light oil-free hydrocarbons are conveyed through pump 13, heat exchanger 8 and line 19 into the cycle of the washing liquid of the first washing stage comprising apparatus 2, 4 and 5.

Through line 20 there is finally supplied an amount of 190 kg. per hour of this hydrocarbon charged with soot to reactor 1, where the main part is cracked and the balance is removed in the separation of the soot formed in reactor 1 together with this recycled soot.

We claim:

1. Apparatus for purifying gases containing acetylene, soot and hydrocarbon mist formed by cracking liquid hydrocarbons in the liquid phase by means of a reactor, which comprises a blower, means for conveying gases from said reactor to said blower, a cyclone separator, means for conveying gases from said blower to said cyclone separator, a Venturi washer, means for conveying gases from said cyclone separator to said Venturi washer, a packed washing tower, means for conveying gases from said Venturi washer to said packed washing tower, means for supplying the liquid hydrocarbons to be cracked to said blower, Venturi washer and packed washing tower, means for collecting the contaminated liquid hydrocarbons from said blower, cyclone separator, Venturi washer and packed washing tower and means for delivering the collected contaminated liquid hydrocarbons back to said blower, Venturi washer and packed washing tower and to said reactor.

2. Apparatus for purifying gases containing acetylene, soot and hydrocarbon mist formed by cracking liquid hydrocarbons in the liquid phase which comprises a reactor, a vacuum pump to be operated with the liquid hydrocarbons to be cracked, means for conveying gases from said reactor to said vacuum pump, a cyclone separator for removing from the gases, hydrocarbon droplets formed in the vacuum pump, means for conveying gases from said vacuum pump to said cyclone separator, a Venturi washer, means for conveying gases from said cyclone separator to said Venturi washer, a packed washing tower, means for conveying gases from said Venturi washer to said packed washing tower, means for supplying the liquid hydrocarbons to be cracked to said vacuum pump, Venturi washer and packed washing tower, means for collecting the contaminated liquid hydrocarbons from said vacuum pump, cyclone separator, Venturi washer and packed washing tower and means for delivering the collected contaminated liquid hydrocarbons back to said vacuum pump, Venturi washer and packed washing tower and to said reactor.

3. Apparatus for purifying gases as defined in claim 1 which comprises means for cooling the collected contaminated liquid hydrocarbons.

4. Apparatus as defined in claim 1 which comprises a further washing tower and a stripper, means for conveying gases from said packed washing tower to said further washing tower, means for supplying liquid hydrocarbons to be cracked to said further washing tower, means for conveying liquid hydrocarbons from the bottom of said further washing tower to said stripper and means for conveying liquid hydrocarbons from said stripper to said means for delivering collected contaminated liquid hydrocarbons back to said blower, Venturi washer and packed washing tower.

References Cited in the file of this patent

UNITED STATES PATENTS

| | | |
|---|---|---|
| 1,282,799 | Frasch | Oct. 29, 1918 |
| 1,762,229 | Isom | June 10, 1930 |
| 1,805,113 | Faber | May 12, 1931 |
| 1,868,204 | Herthel | July 19, 1932 |
| 2,012,959 | Colony | Sept. 3, 1935 |
| 2,073,456 | Sacks | Mar. 9, 1937 |
| 2,668,754 | Lichtenfels | Feb. 9, 1954 |
| 2,853,149 | Gosselin | Sept. 23, 1958 |